United States Patent [19]

Garrett et al.

[11] Patent Number: 4,670,159

[45] Date of Patent: Jun. 2, 1987

[54] PROCESS FOR OBTAINING PURIFIED WATER FROM WET SLUDGES AND SLURRIES OF SOLID MATERIALS

[75] Inventors: David Garrett, Fort Washington; Alfred A. Bacher, Chevy Chase, both of Md.

[73] Assignee: Benmol Corporation, Alexandria, Va.

[21] Appl. No.: 671,401

[22] Filed: Jul. 6, 1984

Related U.S. Application Data

[63] Continuation-in-part of Ser. No. 357,297, Mar. 11, 1982, abandoned.

[51] Int. Cl.⁴ .................................................. C02F 1/54
[52] U.S. Cl. ..................................... 210/711; 210/712; 210/729; 210/768; 210/774; 44/24; 585/15
[58] Field of Search .................................. 210/710–712, 210/729, 609, 753–755, 765, 766, 774, 768; 44/24; 585/15; 62/533–536

[56] References Cited

U.S. PATENT DOCUMENTS

| | | | |
|---|---|---|---|
| 2,974,102 | 3/1961 | Williams | 210/711 |
| 3,058,832 | 10/1962 | Glew | 210/711 |
| 3,126,334 | 3/1964 | Harlow | 62/533 |
| 3,132,096 | 5/1964 | Walton | 210/711 |
| 3,817,048 | 6/1974 | Burley | 62/535 |
| 4,207,351 | 6/1980 | Davies | 210/710 |
| 4,224,039 | 9/1980 | Smith et al. | 44/24 |

FOREIGN PATENT DOCUMENTS 54-158056  12/1979  Japan ................................. 62/533

Primary Examiner—Benôit Castel
Attorney, Agent, or Firm—James J. Brown, Esq.

[57] ABSTRACT

The invention relates to a process for obtaining purified water from wet sludges and slurries of solid materials by treating these materials with a clathrate forming agent at a temperature above the freezing point of water to form a solid clathrate and dewatered solid material. The clathrate and solid material are then separated and the clathrate decomposed to give purified water and clathrate forming agent.

7 Claims, 1 Drawing Figure

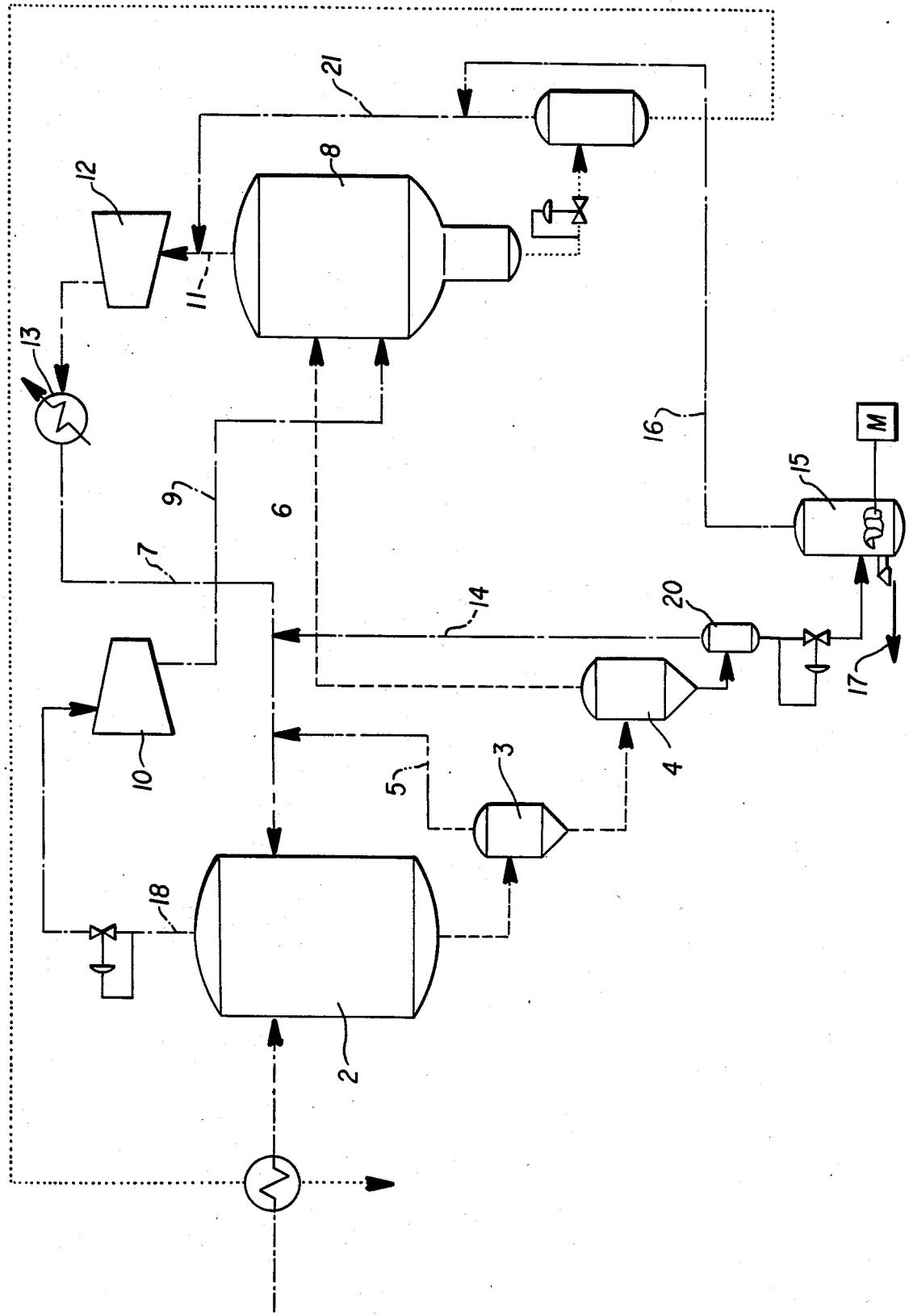

PROCESS FOR OBTAINING PURIFIED WATER FROM WET SLUDGES AND SLURRIES OF SOLID MATERIALS

CROSS REFERENCE TO RELATED APPLICATION

This application is a continuation-in-part of application Ser. No. 357,297, filed Mar. 11, 1982, now abandoned.

SUMMARY OF THE INVENTION

This invention relates to a process for obtaining purified water from wet sludges and slurries of solid material, thus, dewatering said wet solids and concommittantly producing clear water. The process of the invention involves forming solid clathrate compounds with water extracted from the slurries or sludges at low enough temperatures to form the clathrate compounds but above the freezing point of water.

Sludges which may be concentrated by this process, for various purposes, include, but are not limited to: municipal and industrial sewage sludges, radioactive waste sludges, wet peats, wet lignites, wet coals and other industrial sludges.

BACKGROUND OF THE INVENTION

In the past, conventional dewatering or drying methods have employed heat application such as distillation, evaporation, or freezing methods to remove water from sludges and slurries of wet solids. The cost of such processes is high because in the distillation and evaporation processes a substantial amount of heat is required and in the freezing processes a temperature reduction to 32° F. or less is required, necessitating large amounts of heat exchange surface area. Heat application processes also volatilize any volatile matter of the solids to be dewatered.

It is known, for example, that peats, lignites and sludges contain dry solids contents of 2–70 percent by weight and that the dry solids, can have a thermal content (heating value) ranging from 2,500 to 14,000 BTU per pound. It is also known that the volative matter in these sludges may range from 30 to 90 percent by weight of the total dry solids content and that heat treatment processes to concentrate these solids from their water admixture, volatilize these volatile materials causing loss of thermal content and other values and creating odors and sometimes creating noxious chemicals.

Utilization or disposal of the wet sludges by combustion or incineration requires large quantities of supplementary fuel to vaporize the water content of these sludges and raise the steam so produced, to combustion or incineration temperatures.

BRIEF DESCRIPTION OF THE DRAWING

The FIGURE is a flow chart illustrating an embodiment of the invention by way of example.

DESCRIPTION OF THE INVENTION

The present invention is directed to a process for obtaining purified water from wet sludges and slurries of solid materials, thereby dewatering these sludges and solids concommitantly with the production of purified water. This process of the invention uses one or more suitable substances as a working medium to directly cool the sludge by direct contact auto refrigeration of the working medium to form solid clathrate compounds with the water extracted from the sludge, at temperatures above the freezing point of water.

Materials which can be treated by the process of the present invention to obtain purified water and solids of reduced water content will usually contain at least 20 percent by weight water and more frequently at least 30 percent water based on the total weight of the material and be in the form of slurries or sludges. Typical of these materials which are treated by the present invention are municipal and industrial sewage sludges, radioactive waste sludges, wet peats, wet lignites, wet coals and other industrial sludges.

The present invention is thus different from usual freezing processes and this method thus has reduced energy requirements and promotes control of the water removal step. In addition, the capital and operating costs of the process are reduced in comprison with other freezing technologies because the method operates at temperatures above the freezing point of water.

The clathrate forming compounds which are used according to this invention are agents which form solid clathrates which contain up to eighteen molecules of water per molecule of agent. Clathrate forming agents which are useful in this invention exhibit the folowing properties:

Low degree of ionization in water.
Do not form hydrogen bonds with water and have low solubility in water.
Molecular size of the agent is restricted by both an upper and lower size so that it fits into the hydrate crystal lattice. Molecular volume is preferably less than 90 cc/gr. mole.
The boiling point of the agent is usually less than 60° C., but this is not always a controlling criterion.
The agent is chemically stable in the system in which it is used.

Preferably, the clathrate forming agent is:
Inexpensive and readily available.
Relatively non-toxic and non-hazardous.
Has a satisfactory rate of nucleation and growth of hydrate crystals.

Typical of the compounds which can be used as clathrate forming agents in accordance with this invention are low molecular weight hydrocarbons, especially those of 1 to 4 carbon atoms such as methane, ethane, ethylene, cyclopropane, isobutane, low molecular weight halogenated hydrocarbons such as methyl bromide, ethyl and methyl chloride and the freons such as trichlorofluoromethane (Freon 11) and dichlorodifluoro methane (Freon 12), carbon dioxide and halogens such as chlorine, though this agent has the disadvantage of being corrosive and toxic. It will be understood that this listing of suitable clathrate forming agents in exemplary and that other compounds are also suitable for use within the scope of this invention, subject to having the necessary properties set out above. Table I further describes important properties of some of the clathrate forming agents useful in this invention.

TABLE I

| Clathrate Forming Agent | Clathrate Formation (Decomposition) | | |
|---|---|---|---|
| | Temperature °F. | Pressure psia | Molar Ratio Water/Agent |
| Carbon Dioxide | +50 | 840. | 6 |
| Ethylene | +60 | 200. | 17 |
| Propane | +42 | 80. | 18 |
| Freon 21 | +47.6 | 14.7 | 17 |

TABLE I-continued

| Clathrate Forming Agent | Clathrate Formation (Decomposition) | | |
|---|---|---|---|
| | Temperature °F. | Pressure psia | Molar Ratio Water/Agent |
| Chlorine | +84 | 89. | 7 |
| Freon 12 | +54 | 67. | 17 |
| Freon 11 | +46 | 8. | 17 |

Generally, the relative proportion of clathrate forming agent used to wet solids being reated is not critical, although clearly sufficient agent should be used to bind the water being removed from the solids.

The description and practice of this invention may be realized by following the descriptive flow diagram (FIG. 1). After passing through heat exchange 1, sludges or wet solids containing significant amounts of moisture are intimately mixed with a quantity of clathrating agent in vessel 2 so that the predominant matrix of the mixture is clathrating agent. Heat is removed from the agent-wet solids slurry by indirect heat exchange or by controlled evaporation of the clathrate agent until the desired temperature for clathrate formation is reached at an operating pressure for example below 900 psia and substantially all of the water of the wet solids is bound by the crystal structure. The temperature at which clathrate formation occurs according to the present invention will vary depending on the agent being used, but will be above the freezing point of water.

The flow of materials from the clathrate forming step depends at this point in the process on the specific gravity or density of the physical phases.

Densities of these phases will determine their method of separation, because depending upon the clathrating agent used, the liquid agent phase may be lighter or heavier than the solid clathrate phase, and the solid clathrate phase may be lighter or heavier than the dewatered solids phase. For example, the specific gravity of the solids component will usually be 0.9 to 1.5 and the specific gravity of the clathrate crystals will be approximately the weighted molecular average of the crystal composition and will depend on the specific gravity of the clathrating agent.

For the purpose of clearly illustrating the invention, this example uses propane as the clathrating agent, so that there are formed three distinct phases from the hydrate forming step in the process. The lightest phase will be liquid propane with a specific gravity relative to water, of about 0.53. The middle phase will be a slurry of solid propane-water clathrate in liquid propane matrix, the specific gravity of the solid clathrate being about 0.8, and the lower phase will be a slurry of moisture free sludge solids in liquid propane with a specific gravity of solids greater than 1.0 depending upon the relative amounts of organic matter and ash comprising the sludge solids.

The three phases are separated by settling with continuous decantation of each separate phase or by passing the three phase mixture through hydroclones 3 and 4 or other suitable devices known in the art. In the case of the use of hydroclones, two will be required, the first to separate and remove at 5 propane liquid from propane-water clathrate crystals plus sludge solids and the second to separate and remove at 6 propane-water clathrate crystals from sludge solids. Another technique in the case of phase separation with two hydroclones is to separate the propane liquid plus propane-water clathrate crystals from the sludge solids phase in the first hydroclone 3 and then separate propane liquid from clathrate crystals in the second hydroclone 4.

In either technique, three separated phases are further processes as follows:

The liquid propane phase which is still substantially at clathrate forming temperature of about 40° F. is recycled through lines 5 and 7 to the clathrate forming vessel 2 where it is contacted with wet sludge coming into the process. The propane-water clathrate crystal phase is diverted through 6 to a clathrate melting vessel 8 where hydrate crystals are melted by condensing warmed, compressed propane gas entering from line 9 from compressor 10, thus effecting a rapid separation by gravity settling in melter 8 of liquid water which is removed at 20 from gaseous propane which is cycled through line 21 to compressor 12. The propane from the melter is removed as gas at 11 and recycled through compressor 12 and condenser 13 to the clathrate forming vessel and the liquid water may be rejected from the process.

The sludge solids phase in hydroclone 4 is settled in settler 20 to decant the liquid propane matrix fluid which is removed and recycled at 14 and 7 to the clathrate forming vessel, and the sludge solid is diverted to a low pressure flash tank 15 in which propane occluded to the settled sludge solids is flash vaporized and diverted through line 16 to a propane compressor 12 for recovery. The sludge solids, free of water and propane at this point, is removed from the flash tank by a suitable solids handling device 17 which is known to the art, such as a belt conveyor or screw conveyor mechanism.

In the clathrate forming vessle 2, propane-water clathrate crystals are formed by combining liquid propane with water associated with the incoming sludge at about 40° F. and at about 80 psia pressure. Temperature and pressure of operation of this vessel are maintained by controlled vaporization of liquid propane which also acts as the process refrigerant. The vaporized propane from this vessel is removed at 18 and directed to the propane compressor 10.

Compressed propane vapor from compressor 10 is the stream used to melt clathrate crystals at about 43° F. and 85 psia pressure in the clathrate melter 8, thereby condensing said vapor and thus completing the propane processing circuit.

It should be observed, in the general economy of the invention, that the transformation per pound of water to water bound in a solid clathrate crystal requires a heat transfer of about 150 BTU. This is approximate to the latent heat of transition of water to ice of 144 BTU per pound. The amount of energy thus required is not substantially greater than that required to produce ice, but, the temperature need be only of the order of 40° F., to 50° F. and even higher rather than the 32° F. and below which is required for freezing water.

This is obviously of great advantage because it is a great deal more expensive and difficult to provide the lower temperature for ordinary freezing of water. The present invention will be further appreciated by having reference to the following examples.

EXAMPLE 1

In another example of the operation of this invention, peat which has been hydraulically harvested and contains 90% water by weight mixed with liquid ethane, which formed the matrix of the mixture. The mixture temperature was controlled at 55° F. and at about 400 psi by evaporation of liquid ethane and solid crystals of ethane-water clathrate were thus formed with substantially all of the water in the mixture. The resultant mixture of solid peat particles, ethane-water clathrate cyrstals and liquid ethane was pumped through a series of hydroclones so that the first hydroclone separated peat solids in liquid ethane matrix from a mixture of liquid ehtane plus clathrate solids and the second hydroclone separated liquid ethane from clathrate solids in liquid ethane matrix. The liquid ethane has a specific gravity relative to water, of 0.4, the clathrate crystals had a specific gravity relative to water of 0.8 and the peat solids had a specific gravity relative to water of 1.08 so that effective separation of the three phases was accomplished.

The peat solids were settled and decanted from the liquid ethane matrix and subsequently reduced in pressure to vaporize remaining ethane, for recovery, leaving a dry peat product of about 9,400 BTU per pound calorific value.

The ethane-water clathrate solids in liquid ethane were warmed to 60° F. by condensing compressed ethane vapor distributed directly into their mixture, melting the clathrate and allowing water to settle rapidly from the liquid ethane. The liquid ethane was recycled to the clathrate forming vessel and the water was dried of its dissolved ethane content by pressure reduction, which vaporized the small amount of dissolved ethane.

EXAMPLE 2

100 grams of primary sewage sludge from municipal wastewater treatment containing 92.72% by weight of water was mixed with 1,000 grams of freon 11 and the mixture was sealed in a glass container, agitated and cooked to 1.5° C. from ambient temperature of 20° C.

At the ambient temperature of 20° C., the 100 grams of wet sludge floated on the surface of the freon 11. At 1.5° C., white crystals of clathrate compound containing 17 molecules of water per molecule of freon 11 floated on the surface of excess liquid freon 11 and the primary sludge sank to the bottom of the freon 11 liquid phase.

The clathrate crystals were separated and warmed to room temperature to reform liquid water and liquid freon 11 from the clathrate crystals. The water phase was colorless and there were no apparent solids in the water.

The treated primary sludge phase at the bottom of the freon 11 liquid in the clathrate forming vessel was recovered and the freon 11 wetting these solids was vaporized off at 75° F. The remaining sludge phase was weighed, dried of water and re-weighed indicating that the process had concentrated the original primary sludge to 54.03% by weight of solids, thus effecting a 93.32% removal of water from the original sludge.

EXAMPLE 3

The following example is based on calculations using available data.

A 500 gram sample of run-of-mine Illinois coal containing 10.4% moisture by weight was mixed with 2,000 grams of freon 11 in a sealed glass vessel and agitated for one hour at 20° C. At the end of that period of time visual observation showed the coal particles to rise to the tope of the liquid freon 11 layer. The freon layer remained clear and there was no material or separate layer settling to the bottom of the freon.

To the mixture in the above example, sufficient water was added to the coal particles to wet them so that they now contained 22% moisture by weight. The wet coal freon 11 mixture was re-sealed in the glass container and cooled, while agitating to 1.5° C.

Solid crystals of freon water clathrate compound were formed at 1.5° C. and were allowed to separate at this temperature. The vessel contained an upper layer of clathrate crystals, a middle layer of coal particles and a lower layer of freon 11.

The three layers were separated manually at this temperature of 1.5° C. and the clathrate crystals allowed to melt and regenerate liquid moisture. The coal particles were dried of freon by warming and holding at 75° F. and weighed. The coal particles were then dried of moisture and reweighed. It was calculated, thus, that the dried coal after treatment in the clathrate forming process contained 4% moisture by weight.

Initial and final specific gravity of the freon 11 was 1.48 at 20° C. Final specific gravity of treated coal was 1.25 at 20° C. and specific gravity of the clathrate crystals at 1.5° C. was 1.02.

What is claimed is:

1. A process for obtaining purified water from wet sludges and slurries of peats, lignites and coals containing at least about 20 percent by weight water which comprises reacting the water in said sludges and slurries with a clathrate forming agent selected from the group consisting of low molecular weight hydrocarbons, low molecular weight halogenated hydrocarbons, halogens and carbon dioxide at a temperature between 32° and 70° F. and a pressure below 900 psia to form a three phase mixture consisting essentially of (1) an unreacted liquid clathrate forming agent phase, (2) a solid cathrate phase and (3) a dewatered solids phase in a matrix of said liquid clathrate forming agent, separating said clathrate forming agent, said cathrate solids phase and said solid dewatered solids phase, and decomposing said clathrate solids phase into purified water and said clathrate forming agent.

2. The process of claim 1 wherein said wet sludges and slurries contain at least about 30 percent by weight water.

3. The process of claim 1 wherein said cathrate forming agent is a low molecular weight hydrocarbon or halogenated hydrocarbon having 1 to 4 atoms.

4. The process of claim 1 wherein said clathrate forming agent has a molecular volume of less than 90 cc/gram mole and a boiling point of less than 60° C.

5. The process of claim 1 wherein said solid clathrate phase is decomposed by warming above its decomposition temperature.

6. The process of claim 1 wherein said clathrate forming agent is recovered subsequent to the clathrate solids phase being decomposed and recycled to form further clathrate solids phase with additional wet solids.

7. The process of claim 1 wherein said solid clathrate phase contains up to 18 molecules of water per molecule of clathrate forming agent.

* * * * *